April 1, 1941.  H. T. LAMBERT  2,237,233
BRAKE UNIT
Filed March 2, 1940  2 Sheets-Sheet 1
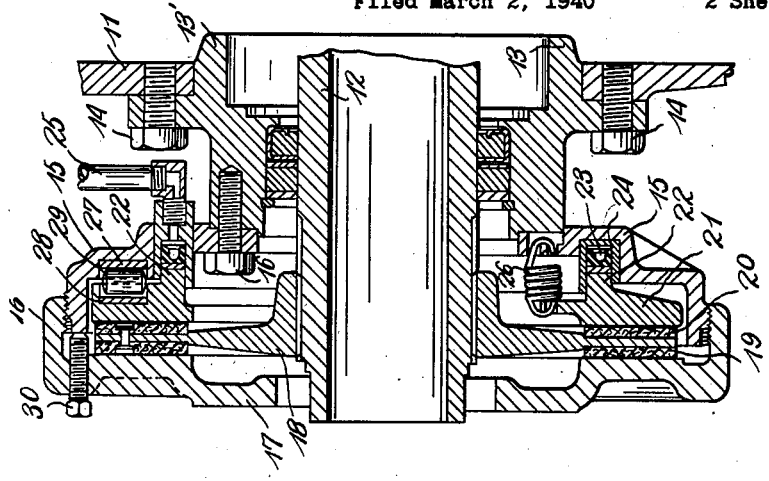
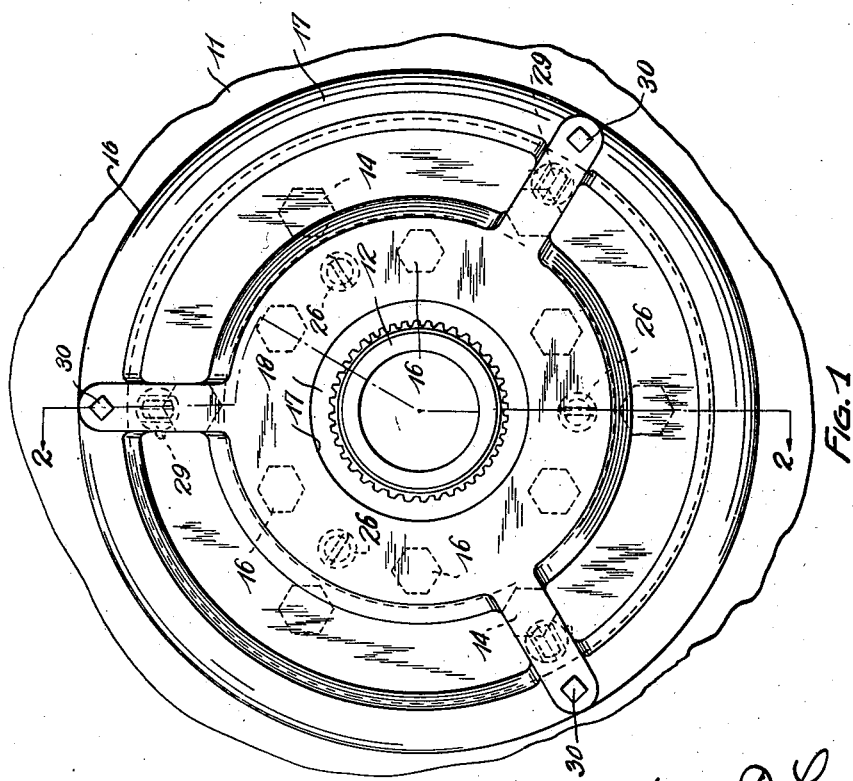
INVENTOR.
Homer T. Lambert
BY
ATTORNEYS April 1, 1941.          H. T. LAMBERT          2,237,233
BRAKE UNIT
Filed March 2, 1940          2 Sheets-Sheet 2

INVENTOR.
Homer T. Lambert
BY
Robb & Robb
ATTORNEYS

Patented Apr. 1, 1941

2,237,233

UNITED STATES PATENT OFFICE 2,237,233

BRAKE UNIT

Homer T. Lambert, St. Joseph, Mich.

Application March 2, 1940, Serial No. 322,026

10 Claims. (Cl. 188—72)

The present invention relates to improvements in brake constructions of the disc type. More specifically, this invention relates to an improved arrangement of adjustable and assembly parts in a brake unit of the disc type.

One of the principal objects of this invention is to provide a brake construction having relatively movable and stationary cooperating brake parts which may be readily attached to and detached from a supporting structure carrying a rotatable shaft to which it is desired to apply a retarding brake force.

A further object is to provide in a brake unit of the disc type, a novel arrangement of parts for adjusting the relative positions of the cooperating brake parts to take up and compensate for wear between such parts.

Other objects and advantages of the invention will become apparent during the course of the following description.

In the drawings, like reference characters designate similar parts throughout the several views. In this showing—

Figure 1 is an elevational view of a brake unit attached to a supporting structure, a part of the supporting structure being shown broken away.

Figure 2 is a sectional view taken substantially on the line 2—2 of Figure 1.

Figure 3:
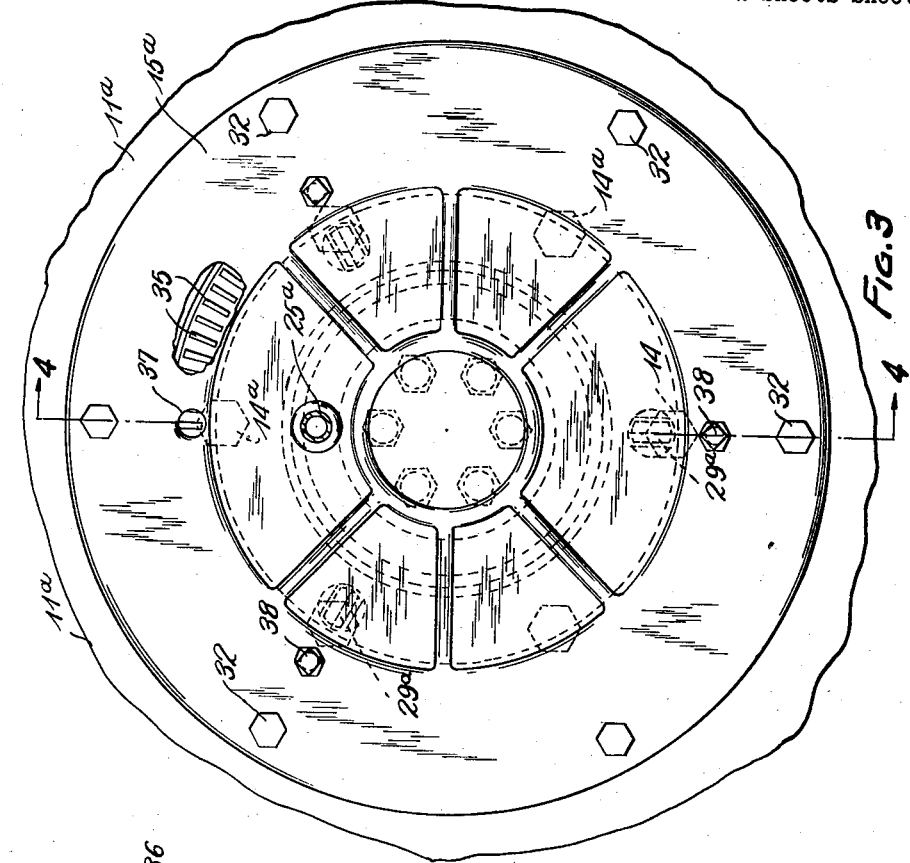
Figure 3 is an end elevational view similar to Figure 1 showing a modified form of brake unit; and, Figure 4 is a sectional view taken substantially on the line 4—4 of Figure 3.

Referring to Figures 1 and 2 of the drawings, the numeral 11 indicates a supporting structure carrying a shaft or rotatable element 12. The supporting structure 11 may be a part of a vehicle, transmission housing, or any other like mechanism having a rotatable part to which it is desired to apply a retarding braking force. A bearing unit, indicated as a whole by the numeral 13, is secured by bolts 14 to the supporting structure 11 for rotatably carrying the shaft 12 with respect to the support 11.

The brake unit employed for imparting a retarding action to the shaft 12 comprises a backing or energizer plate 15 detachably secured to the housing 13' of the bearing unit 13 by bolts 16. As best shown in Figure 2, the outer surface of the energizer plate 15 is provided with threads for engagement with threads formed on the interior surface of a flange 16 integrally connected to a stationary brake disc 17. In this manner, the stationary brake disc 17 is provided with a threaded connection mounting and supporting it on the energizer plate 15, the threaded connection providing for an axial adjustment of the stationary plate 17 in a manner to be described.

Intermediate the stationary brake disc 17 and the energizer plate 15, there is provided a rotary braking member 18. Annular frictional brake facings 19 and 20 are mounted on opposite sides of the rotary braking member 18 for effecting a braking action in a manner which will become apparent.

The rotary brake member 18 has a splined connection with the shaft 12 so as to be rotatable therewith and shiftable axially with respect thereto.

Intermediate the rotary braking member 18 and the energizer plate 15, there is provided a free floating pressure plate 21 formed with an annular flange 22 extending into an annular recess 23 formed on the energizer plate 15.

Since the brake unit is of the semi-hydraulic type, the flange 22 constitutes a piston and the recess 23 its cylinder. A rubber channel sealing ring 24 is mounted in the recess 23 for cooperation with the annular flange 18. Hydraulic pressure fluid is admitted to the cylinder or recess 23 through a suitable connection 25 for exerting pressure on the sealing ring 24 and flange 22 in order to effect movement of the pressure plate or axially movable brake disc 21 into engagement with the braking facing 20, on the rotary brake member 18. Springs 26 are provided for normally maintaining the pressure plate 21 in its retracted position.

Upon movement of the pressure plate 21 into frictional engagement with the rotary brake member 18, the frictional contact will cause rotation of the pressure plate 21 relative to the energizer plate 15. Such relative rotation will bring into action servo or self-energizing mechanism comprising opposed camming inserts 27 and 28 respectively mounted on the energizer plate and the pressure plate 21.

The disc inserts 27 and 28 are provided with V-shaped grooves for the reception of a camming roller 29. Upon movement of the pressure plate 21 relative to the energizer plate 15, the roller 29 will ride up the camming surfaces of the camming discs and cause additional pressure to be built up on the pressure plate 21 in a manner well known in the art.

By reason of the threaded connection of the flange 16 with the energizer plate 15, in order to effect an axial adjustment of the stationary plate 17 to compensate for wear between the cooperating brake parts, it is merely necessary to rotate the stationary plate 17. Set screws 30 engageable with the energizer plate 15 are provided for holding the stationary plate 17 against relative rotation after the desired axial adjustment has been made.

It will be noted that the location and arrangement of the stationary brake plate 17 and its flange 16, makes the same readily accessible for a desired adjustment. It is merely necessary to loosen the set screws 30 whereupon the brake plate 17 may be rotated by hand to effect an adjustment thereof with respect to the baking plate 15. Moreover, it will be noted that the flange 16 connecting the stationary plate 17 to the backing plate 15 in a sense constitutes a housing for the cooperating brake parts.

If it is desired to remove the construction heretofore described from the shaft 12 and the supporting structure 11, it is merely necessary to remove the attaching bolts 14 whereupon the bearing unit 13 and the cooperating brake parts may be pulled endwise out of engagement with the shaft 12.

In the construction shown in Figures 3 and 4, like numerals with the exponent a have been used to indicate parts functioning in the same manner as the parts heretofore described in connection with Figures 1 and 2, notwithstanding differences in the location or shape of such parts. In this construction, in place of having the brake unit connected to the supporting structure 11 by connecting the energizer plate to the bearing housing 13' the housing 11a is provided with an annular flange 31 to which the energizer plate 15a is directly connected by the bolts 32. In addition, it will be noted that the stationary brake plate 17a and the associated cooperating brake parts are located between the energizer plate 15a and the housing 11a instead of having the energizer plate positioned between the cooperating brake parts and the housing 11a as is the case in the construction shown in Figures 1 and 2.

In this construction, the energizer plate 15a is provided with an internally threaded annular flange 33 extending inwardly from the energizer plate 15a. The stationary brake disc 17a is provided with an externally threaded flange 34 extending toward the energizer plate 15a, the flanges 33 and 34 having a threaded connection with each other.

Accordingly, it will be apparent that upon rotation of the flange 34 and its integral brake disc 17a with respect to the energizer plate 15a, there will be effected an axial adjustment of the stationary brake disc 17a with respect to its cooperating brake parts. In order to effect such adjustment, the flange 34 is provided with a plurality of projections 35 for engagement with a suitable adjusting tool 36. An opening 37 is provided in the energizer plate 15a through which the adjusting tool 36 may be inserted. After the adjusting tool 36 has been placed in engagement with the projections 35 the tool 36 may be used as a lever with the edges of the opening 37 providing a fulcrum to effect the turning of the brake disc 17a and the desired axial adjustment thereof.

After the stationary brake disc 17a has been adjustably moved to its proper position, set screws 38 are engageable with the projections 35 and are provided for holding the stationary brake disc from further turning and consequent axial movement out of its proper position.

Figure 4:
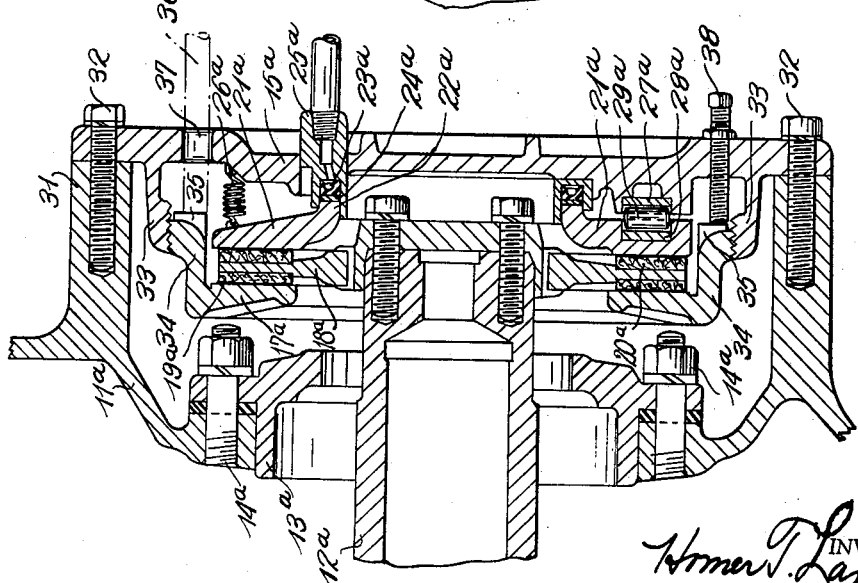

In the operation of the brake units shown in Figures 3 and 4, it will be apparent that upon admission of fluid pressure to the annular recess 23a, the pressure plate 21a will be moved into engagement with the rotary braking member 18a. Such engagement will effect a turning movement of the pressure plate 21a which will automatically bring into operation the servo or self energizing features provided by the disc inserts 27a and 28a and the camming roller 29a to build up additional pressure against the cooperating brake parts.

In both of the brake constructions illustrated herein, the cooperating brake parts are arranged between the energizer plate 15 and the stationary plate 17, the threaded connections between these parts providing means for adjustment and a housing for the cooperating brake parts. In this manner, there is provided an efficient and compact brake unit which may be readily attached to and detached from the supporting structure carrying the member to which it is desired to apply a braking force. By reason of the compactness of this unit, one unit may be readily substituted for another whenever one of the brake units is in need of repair.

Having thus described my invention, what I claim as new and desire to secure by Letters Patent of the United States, is:

1. In brake mechanism of the class described, a support, a self-contained brake unit comprising a stationary brake disc, relatively movable brake parts cooperating with said brake disc, and means for moving said parts into frictional contact with said brake disc to produce a braking action, a shaft housing between the support and brake unit to which the latter is detachably connected, and separate means detachably connecting said shaft housing to said support to permit attachment and detachment of said brake unit with the shaft housing to and from said support.

2. Brake mechanism as claimed in claim 1, wherein said separate detachable connecting means connects the brake unit to one end of the shaft housing and connects the other end of the shaft housing to the support.

3. In brake mechanism of the class described, a support, a brake unit comprising a stationary brake disc, relatively movable brake parts cooperating with said brake disc, and means for moving said parts into frictional contact with said brake disc to produce a braking action, and means detachably connecting said brake unit to said support to permit attachment and detachment of said brake unit to and from said support, said stationary brake disc being provided with a threaded connection with said connecting means and rotatable with respect thereto to effect an axial adjustment thereof with respect to said cooperating brake parts to compensate and take up for wear between such parts.

4. In brake mechanism of the class described, a support, a brake unit comprising a backing plate, a stationary brake disc mounted on said backing plate, cooperating brake parts positioned between said backing plate and said brake disc, means for moving said cooperating parts into frictional contact with said stationary brake disc to produce a braking action, and means detachably connecting said backing plate to said support to permit attachment and detachment of said brake mechanism to and from said support as a unit, said stationary brake disc being provided with a threaded connection with said backing plate and rotatable with respect thereto to effect an axial adjustment thereof with respect to said cooperating brake parts to compensate and take up for wear between such parts.

5. In brake mechanism of the class described, a support, a brake unit comprising a backing plate, a stationary brake disc mounted on said backing plate, cooperating brake parts positioned between said backing plate and said brake disc, means for moving said cooperating parts into frictional contact with said stationary brake disc to produce a braking action, and means detachably connecting said backing plate to said support to permit attachment and detachment of said brake mechanism to and from said support as a unit, said stationary brake disc and said backing plate being provided with threaded flanges having a threaded connection with each other, said flanges together with said stationary brake disc and said backing plate providing a housing for the cooperating brake parts, said threaded connection providing means for adjustably axially moving said stationary brake disc upon rotation thereof with respect to said backing plate to compensate for wear between the cooperating brake parts.

6. In brake mechanism of the class described, a support, an energizer backing plate secured to said support, a stationary brake disc, cooperating axially movable brake parts positioned between said backing plate and said brake disc, means for moving said movable brake parts into frictional engagement with said stationary brake disc to produce a braking action, and self-energizing means intermediate said backing plate and said movable brake parts for building up pressure on said movable brake parts, said stationary brake disc and said backing plate being provided with threaded flanges having a threaded connection with each other, said flanges together with said stationary brake disc and said backing plate providing a housing for the cooperating brake parts, said threaded connection providing means for adjustably axially moving said stationary brake disc upon rotation thereof with respect to said backing plate to compensate for wear between the cooperating brake parts.

7. In brake mechanism of the class described, a support, an energizer backing plate secured to said support, a stationary brake disc, cooperating axially movable brake parts positioned between said backing plate and said brake disc, means for moving said movable brake parts into frictional engagement with said stationary brake disc to produce a braking action, said backing plate being provided with a threaded flange extending toward said stationary brake disc, said stationary brake disc being provided with a threaded flange extending toward said backing plate, said flanges having a threaded connection with each other and providing a housing for said brake parts and means for adjusting the relative axial position of said stationary brake disc upon imparting turning movement to said stationary brake disc relative to said backing plate to compensate for wear between the brake parts.

8. In brake mechanism of the class described, a support, a backing plate secured to said support and provided with a threaded annular flange, a stationary brake disc provided with a threaded annular flange, movable brake parts positioned between said brake disc and said backing plate, means for moving said movable brake parts into frictional contact with said stationary brake disc to produce a braking action, said annular flanges having a threaded connection and together constituting a housing for said brake parts, said stationary braking disc being located outwardly of said backing plate with respect to said support so as to be readily accessible for imparting a turning movement thereto with respect to said backing plate, turning movement of said stationary brake disc being operative to effect an adjustment of the axial position thereof by reason of said threaded connection.

9. In brake mechanism of the class described, a support, a backing plate secured to said support, a stationary brake disc positioned intermediate said backing plate and said support and provided with a threaded annular flange, movable cooperating brake parts positioned intermediate said stationary brake disc and said backing plate, means for moving said movable brake parts into frictional engagement with said stationary brake disc to produce a braking action, said backing plate being provided with a threaded annular flange having a threaded connection with the flange on said stationary brake disc, projections on said stationary brake disc for engagement with a tool to effect turning movement of said brake disc with respect to said backing plate, said turning movement being operative to effect an axial adjustment of said brake disc by reason of said threaded connection to compensate for wear between the cooperating brake parts, said backing plate being provided with an opening rendering accessible said projections for engagement with an adjusting tool.

10. In brake mechanism of the class described, an axle support, a brake device mounted thereon comprising a brake housing, a relatively stationary brake member having threaded connection with the brake housing adjacent the entrance thereof, a rotary brake member, means for shifting the rotary member axially into frictional contact with the stationary member to produce braking effect, a locking device connected to said stationary member and having means to interengage with the brake housing at the entrance thereof to hold said stationary member at adjusted position.

HOMER T. LAMBERT.